(No Model.) 3 Sheets—Sheet 1.
C. W. JEFFERSON.
ELECTRIC MOTOR AND DYNAMO MICA INSULATOR.
No. 491,708. Patented Feb. 14, 1893.
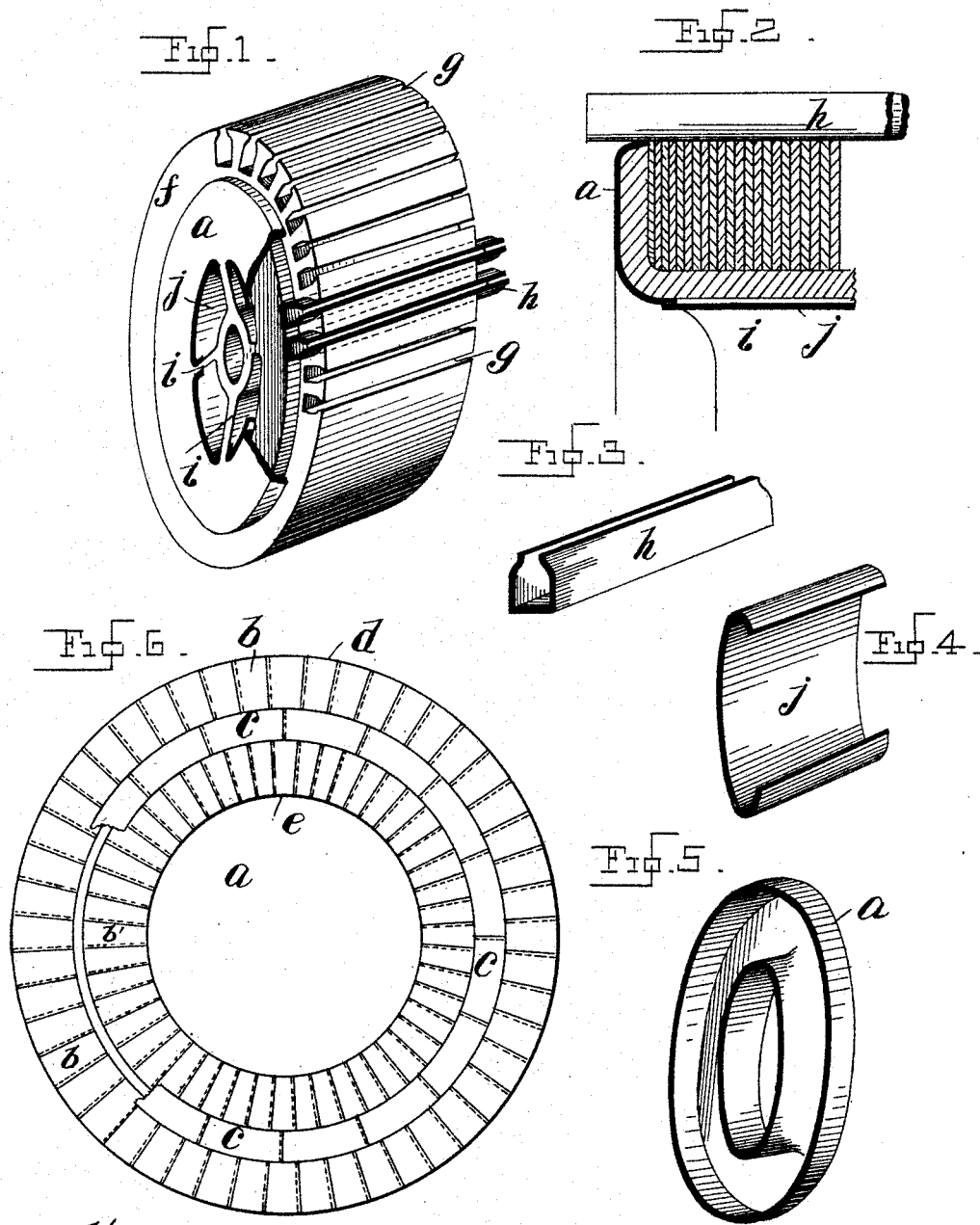

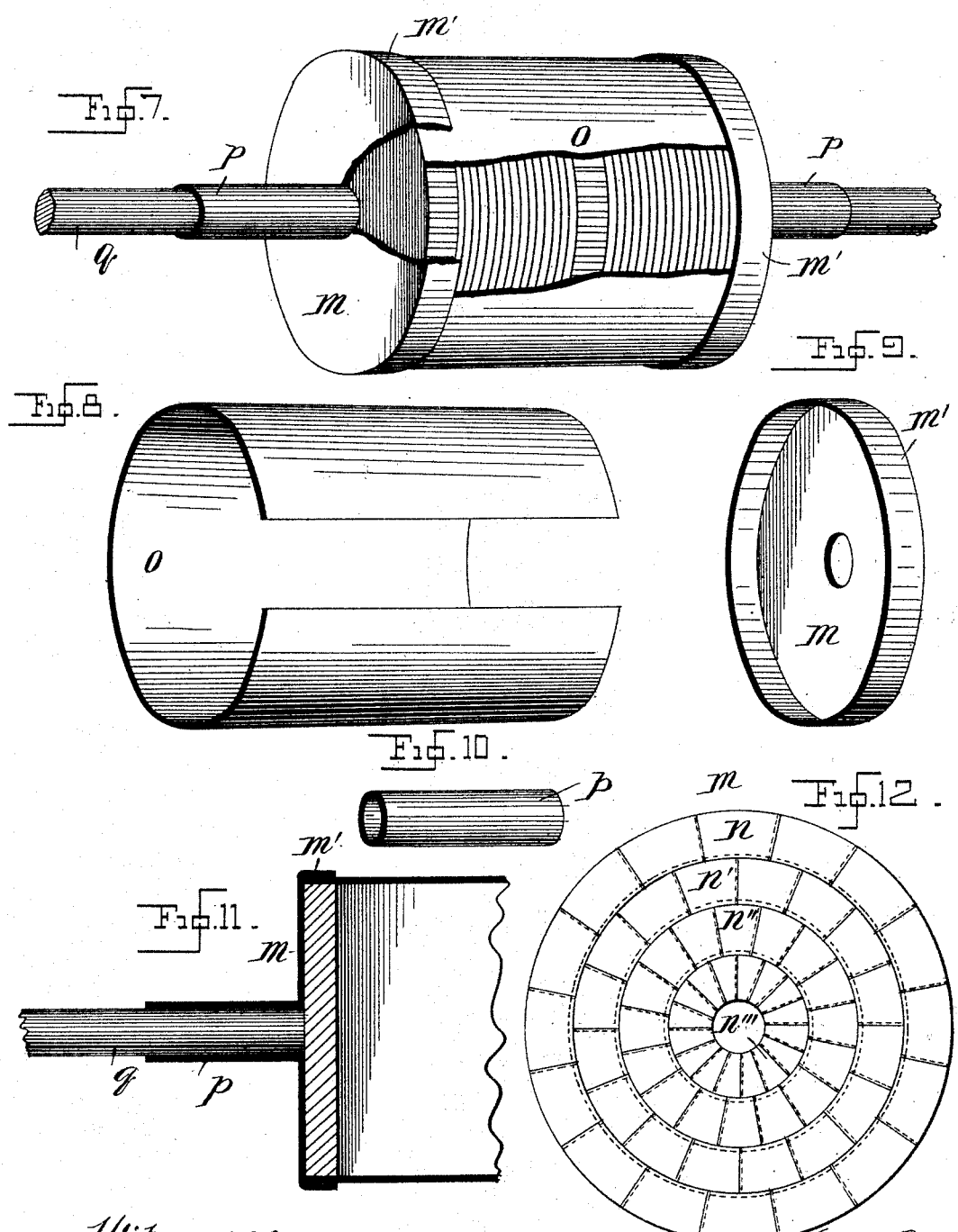

(No Model.) 3 Sheets—Sheet 3.

C. W. JEFFERSON.
ELECTRIC MOTOR AND DYNAMO MICA INSULATOR.

No. 491,708. Patented Feb. 14, 1893.

Witnesses
Wm. H. Courtland
Nellie L. Pope

Inventor
Charles W. Jefferson,
By his Attorney,
Edward P. Thompson

UNITED STATES PATENT OFFICE.

CHARLES W. JEFFERSON, OF SCHENECTADY, NEW YORK, ASSIGNOR TO EUGENE MUNSELL & CO., OF NEW YORK, N. Y., AND ELIZABETH, NEW JERSEY.

ELECTRIC MOTOR AND DYNAMO MICA INSULATOR.

SPECIFICATION forming part of Letters Patent No. 491,708, dated February 14, 1893.

Application filed June 1, 1892. Serial No. 435,171. (No model.)

*To all whom it may concern:*

Be it known that I, CHARLES W. JEFFERSON, a subject of the Queen of Great Britain, and a resident of Schenectady, in the county of Schenectady and State of New York, have invented certain new and useful Improvements in Electric Motor and Dynamo Mica Insulators, (Case No. 3,) of which the following is a specification.

My invention relates to the end pieces or heads and other insulating wrappers for armatures, dynamos or electric motors.

The object of the invention is to thoroughly equip the armature with insulation which is practically entirely formed of mica, which is known to be among the very best electrical insulators.

In order that my invention may be understood as applied to any of the ordinary types, I have shown the same, in detail as regards the Gramme, the Siemens, and the Pacinotti, by means of the accompanying drawings.

Figure 13:
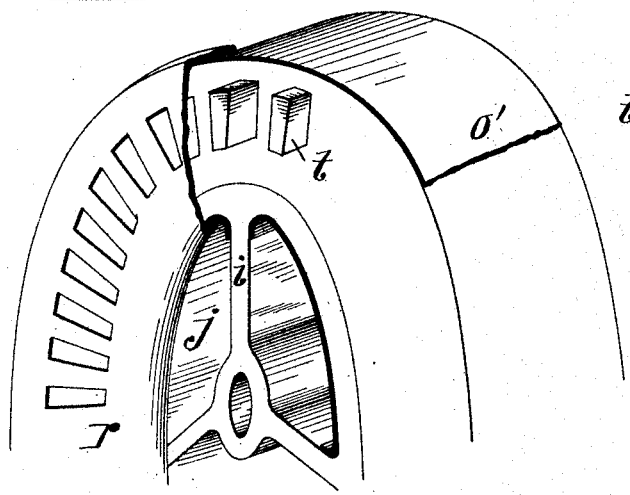
Figure 14:
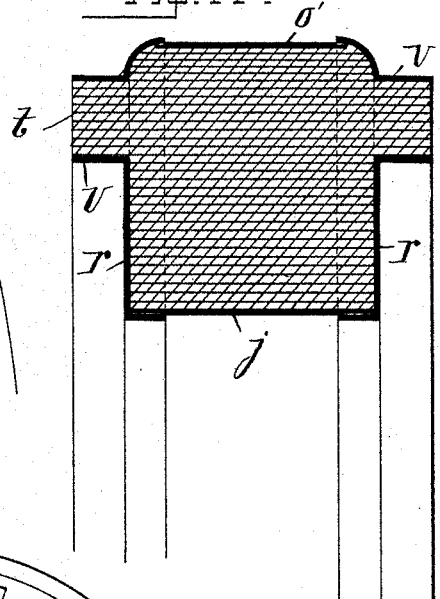
Figure 15:
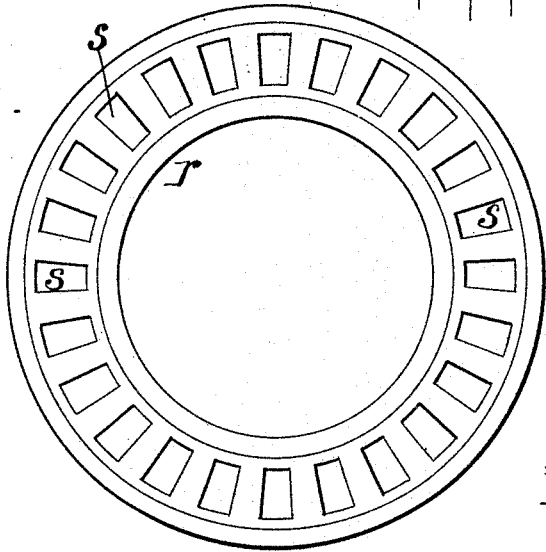
Figure 16:
Figure 17:
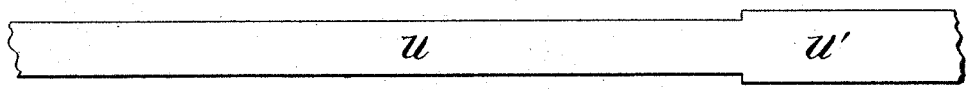

Figure 1 is a perspective view of a Gramme or ring armature, provided with mica insulators in accordance with my invention. Some of the insulators are omitted and parts are broken away, and only some of the grooves are indicated in the drawings. Fig. 2 is a section of a portion of the armature shown in Fig. 1, indicating particularly the iron laminæ and pulley for holding the same. Fig. 3 is one of the insulators to be inserted in the grooves shown in Fig. 1, whereto such insulators are applied. The insulator in Fig. 3 is shown in perspective. Fig. 4 is the mica insulator applicable to the interior of the ring. Fig. 5 is a perspective view of the flanged annular mica disk employed as a head piece to the ring armature. Fig. 6 shows in plan the mechanical construction of the head piece represented in Fig. 5. Fig. 7 is a perspective view of a drum armature with parts broken away for the purpose of showing that to which the mica insulators are applied. Fig. 8 is a perspective view of the cylindrical mica insulator shown partly also in Fig. 7. Fig. 9 is a perspective view of the mica insulating head. Fig. 10 is a similar view of the insulating tubing for the armature shaft. Fig. 11 is a sectional view showing the application of the elements in Figs. 8, 9, 10. Fig. 12 is a plan of the head before it is flanged, showing the mechanical construction thereof. Fig. 13 is a perspective of a ring armature having end projections to form notches to hold the conductors. Only a part of the armature is shown. Fig. 14 is a section of a portion of the armature shown in Fig. 13. Fig. 15 is a plan of the mica head piece seen in Fig. 13. Fig. 16 is an insulator for the projections seen in Fig. 13. Fig. 17 is a plan of a portion of the iron ribbon forming the core shown in Fig. 14.

The head $a$ has the following construction: Radial mica scales $b$ are fastened together with overlapping edges to form a ring; a concentric ring is likewise formed of scales $b'$, the two rings not overlapping each other in the construction shown in Fig. 6.

$c$ represents mica scales overlapping each other and forming a ring connecting the first two named rings which are lettered $d$ and $e$. The scales $c$ overlap the scales $b$, $b'$; several rings $a$ are made in like manner and piled on top of each other, cemented with varnish, compressed; and before drying are molded by pressure into substantially the form shown in Figs. 1 and 5. During the process of bending in the mold, the radial and overlapping mica scales $b$, $b'$ and $c$ slide to accommodate the bending, so that, if the varnish is dried while in the mold, the ring $a$ will take up a permanent set which will exhibit the form shown in Figs. 5 and 1. The slotted insulator in Fig. 3 is also constructed of laminæ made of artificial mica sheets, constructed in a manner similar to that named in reference to the ring shown in Fig. 6. It is of such a form as to slide into the dove-tailed grooves $g$ in the armature $f$. The ends of the slotted insulators $h$ shown in Fig. 3, project beyond the grooves $g$. Between the spokes $i$, are curved insulators $j$ which are cylindrical with a given cylinder, except near the ends, which are abruptly bent inwardly against the spokes. The sheet of which the insulator $j$ is constructed is built up of mica scales having cemented overlapping joints.

The head $m$ shown in Figs. 7, 9, 11, and 12 consists of concentric overlapping rings made of overlapping mica scales $n$, $n'$, $n''$, $n'''$, cemented together and piled on top of one another as to the concentric rings considered together as their disk. While the varnish is still wet the flange $m'$ is turned up and thus held during the process of drying the varnish, after which the head remains as a flanged insulator. The split cylinder $o$ is also built up of laminated mica sheets each consisting of scales of mica overlapping. The said cylinder is wrapped upon the drum armature as in Fig. 7. The head $m$ is applied to the end of the armature in such a manner that the flange $m'$ overlaps the end of the cylinder $o$. The mica insulating tube $p$ is applied to the shaft $q$ which it fits snugly.

The head $r$ is an annular disk with its inner and outer edges flanged and provided with trapezoidal perforations $s$, through which pass iron projections $t$ of the armature core, which is made of a ribbon $u$ wound in convolutions and having wider portions $u'$ to form the said projections $t$. In Fig. 17 the strip is magnified in length and diminished in width for the purpose of illustrating better that the strip $u$ has an enlarged portion. Upon the trapezoidal projections $t$ are slipped and held trapezoidal tubes $v$, so that when wire is wound in the usual manner, it will be held effectually away from the metallic part of the armature. On the interior of the armature are pieces of mica insulating sheets $j$ exactly like that shown in Fig. 4.

The trapezoidal tubes $v$, and the circular tube $p$ may be held to the heads by shellac or varnish. Also varnish may be applied between the heads $a$, $m$ and $r$ and the insulating covering of armature shown in Fig. 13.

I claim as my invention:

1. An annular disk for insulating armature head, consisting of laminæ of annular disks each of which consists of the combination of concentric rings formed of mica, with their edges overlapping and cemented together and a ring of mica scales overlapping and cemented to one another and to said first named rings.

2. A disk for insulating armature heads, consisting of concentric rings of mica scales, radiating from the center, overlapping and cemented together at their edges.

3. A disk for insulating armature heads, consisting of concentric rings of mica scales, radiating from the center, overlapping and cemented together at their edges, and a flange formed at the periphery of said disk.

4. An armature consisting of the combination of a ring core supported upon radial spokes, a flanged annular mica disk, applied to each end of said ring, the flanges passing to the interior and exterior of said ring, curved mica sheets applied to the interior of said ring, between the spokes, slotted mica insulators $h$, applied in grooves which are provided on the exterior of said armature, and projecting from said grooves at the ends.

5. An armature consisting of the combination of a ring core supported upon radial spokes, a flanged annular mica disk, applied to each end of said ring, the flanges passing to the interior and exterior of said ring, curved mica sheets applied to the interior of said ring, between the spokes, slotted mica insulators $h$, applied in grooves which are provided on the exterior of said armature and projecting from said grooves at the ends, each of the said mica insulators being formed of mica scales cemented together with overlapping edges cemented together.

In testimony that I claim the foregoing as my invention I have signed my name in presence of two witnesses, this 28th day of May, 1892.

CHARLES W. JEFFERSON.

Witnesses:
A. H. JACKSON,
S. W. JACKSON.